UNITED STATES PATENT OFFICE.

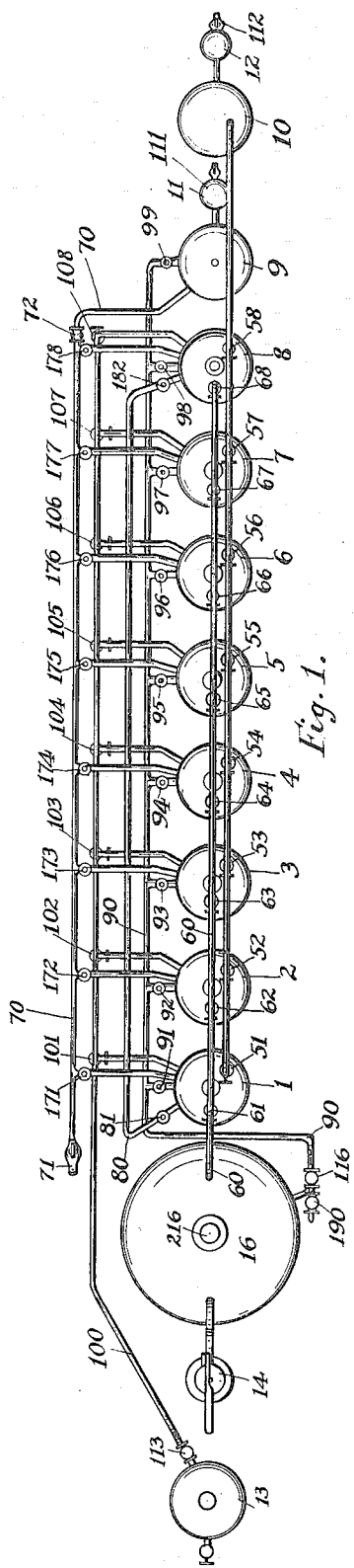

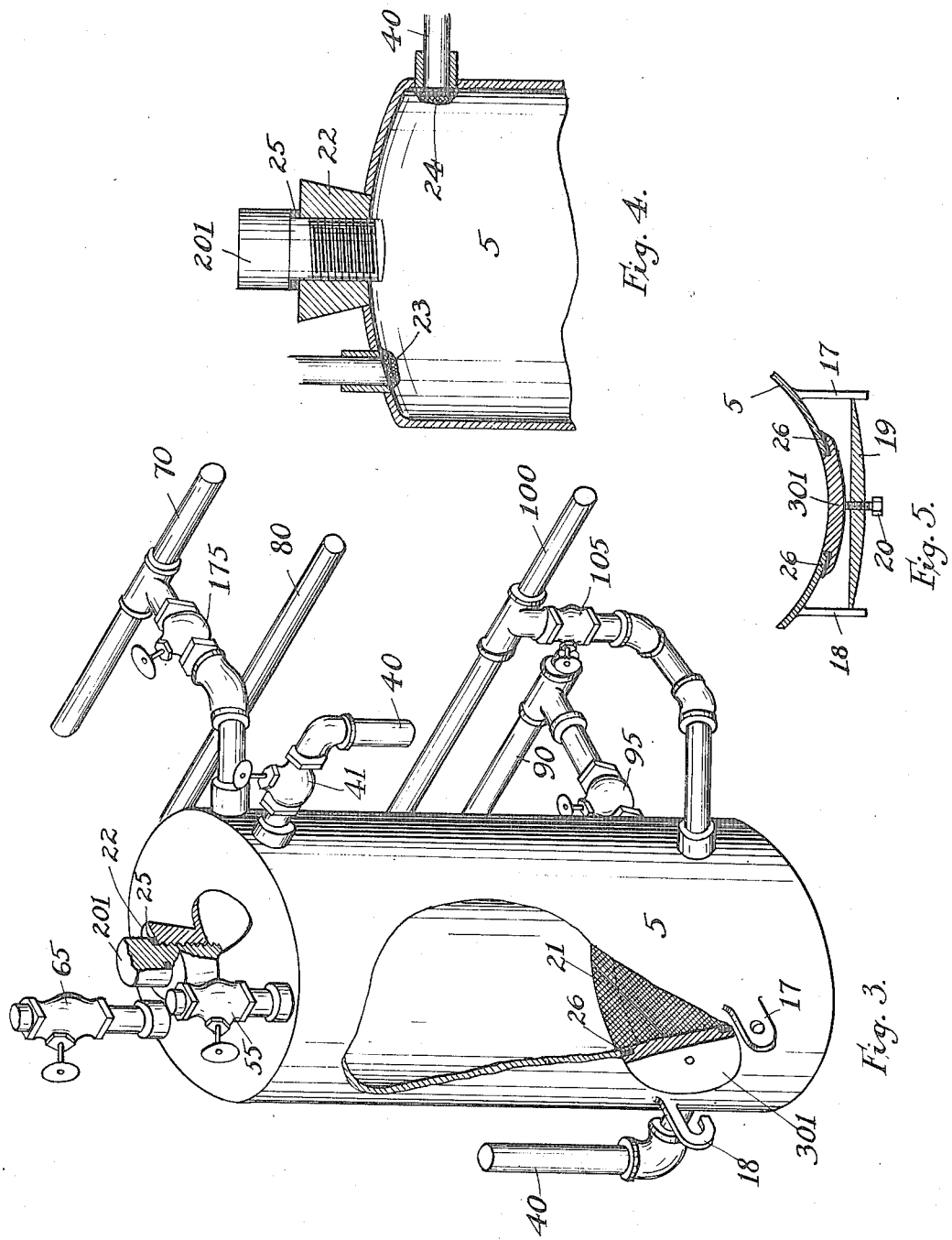

ZOBEL ARONOWITZ, OF NEW YORK, N. Y.

APPARATUS FOR REFINING POTABLE GRAIN SPIRITS.

1,206,495.  Specification of Letters Patent.  Patented Nov. 28, 1916.

Application filed January 11, 1916. Serial No. 71,415.

*To all whom it may concern:*

Be it known that I, ZOBEL ARONOWITZ, a citizen of the United States, and resident of the city of New York, in the county of Bronx and State of New York, have invented certain new and useful Improvements in Apparatus for Refining Potable Grain Spirits, of which the following is a specification.

This invention relates to apparatus for refining potable grain spirits by the removal of the obnoxious fusel-oil and other impurities.

The object of this invention is to provide an apparatus which is economical, continuous and automatic in its operation.

A further object is the provision of an apparatus in which the flow velocity of the spirits refined therewith can be regulated and the speed of the refining process varied as desired.

A further object of the invention is the provision of means whereby any of the filters may be made the first or last in operation in order to obtain the most efficient refining action.

A further object is the provision of means to be used in combination with the refining apparatus for varying the strength of the refined spirits.

A further object of the invention is the provision of an efficient filter from which the filtering material may readily be removed when unclean and fresh material readily inserted.

A further object of the invention is the provision of means for removing spirits and impurities from the charcoal contained in the filter vessels and from the walls and insides of the parts of the apparatus.

For the attainment of the aforesaid and other objects, I employ the apparatus shown in its preferred form in the accompanying drawings, in which, Figure 1 is a plan of my apparatus, most of the pipes and valves being shown in different vertical planes for the sake of clearness. Fig. 2 is a front elevation of my apparatus showing some of the pipes and connections not shown in Fig. 1. Fig. 3 is a perspective drawing of one of the charcoal filter vessels partly in section showing the various pipes connected to said vessel and the valves on said pipes. Fig. 4 is a vertical section through the middle of the upper part of the filter vessel shown in Fig. 3 and Fig. 5 is a horizontal section of a portion of said filter vessel near its lower end.

In the practical embodiment of my invention, I employ a mixing tank 15, having a suitable liquid proof closure 215 through which the spirits and the quantity of water necessary to make the spirits of the proper strength may be poured. A pump 14 operated manually or mechanically is connected by means of pipe 30 to the lower part of tank 15, and forces the spirits through pipe 27 to feed tank 16, said tank 16 having a suitable liquid proof closure 216. From feed tank 16, the pipe 90, having valve 116 thereon near the tank end, runs behind filter vessels 1, 2, 3, 4, 5, 6, 7, 8 and 9, which are preferably placed in consecutive order in a straight line and at a level between that of tanks 15 and 16, said pipe 90 being connected to said filter vessels near the bottom thereof by short branch pipes having thereon valves 91, 92, 93, 94, 95, 96, 97, 98 and 99. A branch of said pipe 90 is connected to mixing tank 15, the spirits being prevented from flowing directly from tank 16 to tank 15 by closing valve 190 on pipe 90. From the upper end of filter 1 to the lower end of filter 2 is connected pipe 40 having thereon valve 41. Similar pipes 40 having thereon valves 41 are similarly connected from filter vessels 2 to 3, 3 to 4, 4 to 5, 5 to 6, 6 to 7 and 7 to 8, said filter vessels 1 to 8 inclusive being adapted to hold charcoal of proper quality in a manner hereinafter described. To prevent air binding in the charcoal filters when any one of said filters is first filled, pipe 60 connected to tank 16 is also connected by branch pipes to said filter vessels, valves 61, 62, 63, 64, 65, 66, 67 and 68 being provided on said branches to said filter vessels 1, 2, 3, 4, 5, 6, 7 and 8 respectively.

When filter vessel 1 which is the first in line, is not the first in operation, it becomes necessary to connect filter vessel 8 to filter vessel 1. This is done by pipe 80 having thereon valve 81 for vessel 1 and valve 182 for vessel 8, the connection being made from the upper end of said vessel 8 to the lower end of vessel 1. After the spirits have passed through all the charcoal filters, they are sent through the sand filter by means of pipe 70 having at one end thereof faucet 71 and being connected at the other end to sand filter 9, said pipe 70 having branches thereon to each of the coal filters, said branches having thereon valves 171, 172, 173, 174, 175, 176, 177, and 178 for filters 1, 2, 3, 4, 5, 6, 7 and 8 respectively, valve 72 being provided for the sand filter. Said pipe 70 and the valves and faucets thereon are also used for the purpose of discovering if any stoppage of the flow of spirits has occurred and to locate the place of stoppage in a manner hereinafter described. A glass bell jar 11 is suitably connected to sand filter 9, a hydrometer not shown being placed in said jar 11 to suitably float in the spirits and to indicate the strength thereof during the refining process, the continuous flow of spirits being also observable through said jar. Faucet 111 is provided to draw off the refined spirits into suitable casks.

For the purpose of raising the strength of any given quantity of the refined spirits, for cleaning the impurities from the entire apparatus and for removing the spirits absorbed by the coal, a steam apparatus is preferably provided in addition to and in combination with the filtering apparatus above described. Said steam apparatus comprises the steam boiler 13 having suitable connections for water and the steam inlet pipe 100, into which steam may be admitted by means of valve 113 on said pipe. Branch connections to each coal filter having valves 101, 102, 103, 104, 105, 106, 107, and 108 thereon for filters 1, 2, 3, 4, 5, 6, 7, and 8 respectively, are provided to allow steam to enter the lower end of each of the filter vessels. To draw off the spirits distilled from the spirits by the steam, vapor outlet pipe 50 having thereon branch connections with valves 51, 52, 53, 54, 55, 56, 57 and 58 to filters 1, 2, 3, 4, 5, 6, 7 and 8 respectively, are provided, said pipe 50 terminating in a pipe coil 28 inserted in condensing vessel 10. Said condensing vessel 10 has at the lower end thereof a cold water inlet pipe 310 having thereon a valve 110, the upper end of said vessel having attached thereto the water outlet pipe 210. Coil 28 is suitably connected to a glass bell jar 12 in which is placed a hydrometer in a manner similar to that described for jar 11, faucet 112 being provided to draw off the condensed distillate from coil 28.

Referring to Figs. 3, 4 and 5 in connection with a detailed description of each of my improved coal filter vessels, I will describe the vessel 5, the same description applying substantially to the vessels 1, 2, 3, 4, 6, 7 and 8. I prefer to make said vessels of non-corrodible metal, such as tin-plated copper, an opening being provided near the lower end of said vessels for doors 301. The door 301 is made preferably of brass and is taken down when the coal is to be removed from the filter vessel, by loosening bolt 20 which is threaded into cross piece 19 supported in brackets 17 and 18, said bolt 20 when turned in the proper direction tending to draw cross piece 19 and door 301 together. To form a liquid proof closure for said door 301, bolt 20 is turned in the proper direction separating door 301 and cross piece 19 and causing said door to press firmly against the suitably shaped rubber washer 26. For supporting the coal, screens 21 preferably made in sections for easy removal, and properly supported by suitable brackets attached to the inside of filter vessel 5, are provided. Suitable openings are made in said vessel for incoming and outgoing material, each of the outgoing connection openings being preferably provided with a screen as 23 and 24 for preventing the carrying of coal by outgoing material into the various outlets. For ease in inserting fresh coal into the filter vessel, a hollow plug 22 preferably of brass is suitably fastened in the upper end of said vessel, and is suitably threaded to receive closing plug 201 which screws down against rubber washer 25 to form a liquid proof closure.

During the following description of the operation of my apparatus, it is understood that all the valves are closed unless it is specifically stated that a valve is to be opened, and that the method of operation for one filter vessel as described is substantially the same for all, since all of the charcoal filter vessels excepting vessels 1 and 8 are identical in construction.

Spirits having been poured into tank 15 and properly diluted with water so that it is about 5% higher than its final strength, said allowance of 5% being made for reduction of strength in the refining process, pump 14 is operated to force the spirits into feed tank 16. Valve 116 is then opened. If it is assumed that the apparatus is being operated for the first time, then there is equally clean charcoal in all the filters. The filtration taking place through the successive filters in consecutive order, valve 91 is opened sufficiently to allow the vessel to fill in about 15 or 16 hours, this being the time shown by experience to be necessary for the proper absorption of impurities by the charcoal. At the same time, valve 61 is opened to allow the escape of the air from vessel 1. If the pressure from feed tank 16 is too strong, or if valve 61 is opened for too long a time, the spirits instead of being lost will rise in pipe 60 and return to tank 16. When filter 1 becomes full, valve 61 is closed and the valve 41 from said filter is opened sufficiently to allow filter 2 to fill in about 15 or 16 hours, valve 62 being opened at the same time to allow the escape of air from filter 2. The same method is used until all the eight charcoal filters are full of spirits, this taking a time of about 5 to 6 days. The spirits having passed through the charcoal filters in the given time, they are ready for the final filtration through the sand filter 9, which is constructed similarly to the charcoal filter vessel, but which is designed to contain the proper grade and quantity of sand. Valves 178 and 72 are opened for this purpose. If the spirits are of the proper strength, as shown by the hydrometer in jar 11, and if they flow regularly as is ascertainable by looking into said jar 11, no stoppage having occurred, faucet 111 is opened and the refined spirits are allowed to pass into suitable receptacles. If it is found that the flow has been stopped somewhere along the line, all the valves and faucets on line 70 are first closed, then by opening valve 171 and faucet 71 it can be seen whether the stoppage is at vessel 1 as will be the case if spirits do not flow from faucet 71. Vessel 2 can be tested in a similar manner by opening valve 172 and faucet 71, and so on down the line of filters. If, while the refining process is going on, it is desired for any reason to produce a quantity of spirits of a strength higher than that originally contemplated, steam is admitted to the operatively last of the charcoal filters by opening the proper steam inlet valve as 108 for filter 8. The steam heats the spirits, vaporizing and separating the more volatile alcohol from the water, thus distilling the spirits in the vessel as 8 into which the steam has been admitted. By opening valve 58, the vapors are carried over to coil 28, the cold water in vessel 10 condensing the vapors into spirits stronger than those originally contained in filter 8. The hydrometer in jar 12 shows whether the correct strength is being obtained. If not, the quantity and heat of the steam may be varied by regulating the proper valves in a manner well known in the art.

After the apparatus has been in use for a time, it will be found that the charcoal in filter 1 having continually come in contact with the spirits in their unrefined state, will have absorbed more of the fusel-oil and other impurities from the spirits than the charcoal in any of the other filters, the charcoal in vessel 2 having absorbed more impurities than the charcoal of any of the following filters, and so on, the coal of filter 8 being the cleanest. It will then become necessary to insert fresh coal in filter 1, to maintain the efficiency of the refining action. To do this without wasting any of the spirits in filter 1, the valves on all the pipes connected to said filter are first closed, and the spirits drained from said filter by opening valves 91 and 190, valve 116 being closed. Valves 190 and 91 are closed after the spirits have been removed, and the spirits and impurities contained in the charcoal removed by distillation, steam being admitted to the filter vessel by opening valves 113 and 101. The spirits being more volatile than the fusel-oil, it is possible to separate the spirits from the impurities by the well known processes of fractional distillation in my apparatus. If it is not desired to retain or collect the volatile impurities, the water in condensing vessel 10 is allowed to become hot or is drained off through pipe 310, the vapor then passing out through faucet 112. It must be remembered after opening the steam admission valve also to open vapor outlet valve 51 for the proper removal of the spirits from the coal. All the valves are now again closed, and the used coal removed by taking door 301 away from the vessel, bolt 20 being turned in the proper direction, the coal being easily removed through the large opening in the vessel. No coal being left in the vessel, door 301 is replaced and the inside vessel and pipe walls are thoroughly cleaned by admitting steam through valve 101, valve 51 being opened at the same time to permit the exit of the vapors. Vessel 1 being now entirely clean, valves 101 and 51 are closed, plug 201 unscrewed and fresh coal inserted into the filter vessel through the opening in plug 22.

While filter 1 is still the first in line, it now becomes necessary to make said filter the last in operation, since it contains the cleanest coal of all the filters. It also becomes necessary to disconnect filter 8 from the sand filter and to connect the operatively last coal filter, that is, filter 1, with said sand filter. To these ends, valves 81 and 182 on pipe line 80 are opened to allow the spirits to flow from the top of filter 8 to the bottom of filter 1 and valves 171 and 72 on pipe line 70 are opened to connect filter 1 with sand filter 9. Vessel 2 is now the first in operation and therefore valves 116 and 92 are opened to feed filter 2 first, the flow of spirits being from filter 2 through pipe 40 to filter 3, through pipe 40 to filter 4, through pipe 40 to filter 5, through pipe 40 to filter 6, through pipe 40 to filter 7, through pipe 40 to filter 8, through pipe 80 to filter 1, through pipe 90 to the sand filter 9 and out through faucet 111. The charcoal in filter 2 is replaced in a manner similar to that described for filter 1, when necessary, the coal being replaced in the various filter vessels in consecutive order.

After fresh coal is placed in vessel 2, that filter 2 is made the last in operation by opening valve 41 from vessel 1, opening valves 172 and 93, valves 92 and 171 being shut. The position of the valves at once indicates which is the first filter in operation and which is the last, the flow being in consecutive order between the first and last, and the filter with the fresh coal being always the last in operation. The process after being started is automatic and requires little attention except when the coal is to be changed. Changing the coal and turning the proper valves is a simple and easily learned operation, errors being readily detected. None of the spirits can be lost during the ordinary operation of the process by evaporation or otherwise except by making an error in the opening of the valves. The strength of the spirits procured is always ascertainable and the strength of a certain quantity may be raised a certain amount as described during the refining process.

It is obvious that various changes such as arrangement of the filters in a circle instead of a straight line, varying the shape, and size of the filters, the shape, position and length of the connecting pipes and to some extent, the position of the valves, may be made without departing from the scope of my invention.

What I claim is:

1. In an apparatus for refining potable grain spirits, a spirits reservoir, a series of charcoal filters, means for controllably feeding the spirits from said reservoir to any of said filters to cause said reservoir fed filter to be the first in operation, means for controllably causing the spirits to flow through said filters consecutively, and means for testing the continuous flow of said spirits between said filters and for controllably causing said spirits to flow from the operatively last charcoal filter.

2. In an apparatus for refining potable grain spirits, a mixing reservoir, a series of charcoal filters at a level higher than that of said mixing reservoir, a feed reservoir at a level higher than that of said filters, means for transferring the spirits from said mixing reservoir to said feed reservoir, a pipe line connecting said feed reservoir and said filters, a valve on said pipe line for each of said filters, pipes connecting the upper end of each filter with the lower end of the filter consecutively juxtapositioned, valves on said filter connecting pipes, a pipe connecting the upper end of the filter last in position with the lower end of the filter last in position, valves on said last mentioned pipe, a steam pipe line operatively connectible to each of said charcoal filters, a pipe line connecting each of said charcoal filters with a vapor condensing apparatus, valves on said last mentioned pipe, a pipe line connecting said charcoal filters with a sand filter and valves on said last mentioned pipe line.

3. A charcoal filter for refining potable grain spirits comprising in combination a metallic filter vessel, a coal supporting screen near the lower end of said vessel, a liquid proof door closure at the lower part of said vessel for removing coal therethrough, a liquid proof closure at the upper end of said vessel for inserting coal therethrough, a steam conducting pipe, a spirits inlet pipe, a spirits outlet pipe, a vapor outlet pipe, an air relief pipe, a sand filter connection pipe, all of said pipes being connected to said filter vessel, valves on each of said pipes and screens attached on the inside of said filter vessel at each of the outlet and air relief pipe connections for preventing coal from entering said pipes.

Signed at the city of New York, in the county of New York, and State of New York, this 6th day of January, A. D. 1916.

ZOBEL ARONOWITZ.